(12) United States Patent
Zhang et al.

(10) Patent No.: US 11,429,851 B1
(45) Date of Patent: Aug. 30, 2022

(54) NEURAL NETWORK CONTROLLER

(71) Applicant: Xilinx, Inc., San Jose, CA (US)

(72) Inventors: Xiaoqian Zhang, San Jose, CA (US);
Ephrem C. Wu, San Mateo, CA (US);
David Berman, San Jose, CA (US)

(73) Assignee: XILINX, INC., San Jose, CA (US)

( * ) Notice: Subject to any disclaimer, the term of this patent is extended or adjusted under 35 U.S.C. 154(b) by 930 days.

(21) Appl. No.: 16/219,303

(22) Filed: Dec. 13, 2018

(51) Int. Cl.
  *G06N 3/063* (2006.01)
  *G06N 3/04* (2006.01)
  *G06F 9/30* (2018.01)
  *G06F 9/34* (2018.01)

(52) U.S. Cl.
  CPC .......... *G06N 3/063* (2013.01); *G06F 9/3001* (2013.01); *G06F 9/30101* (2013.01); *G06F 9/34* (2013.01); *G06N 3/0454* (2013.01)

(58) Field of Classification Search
  CPC ...... G06F 9/3001; G06F 9/30101; G06F 9/34; G06N 3/0454; G06N 3/063
  See application file for complete search history.

(56) References Cited

PUBLICATIONS

Yazdanbakhsh, Amir, et al. "Flexigan: An end-to-end solution for fpga acceleration of generative adversarial networks." 2018 IEEE 26th Annual International Symposium on Field-Programmable Custom Computing Machines (FCCM). IEEE, Sep. 2018. (Year: 2018).*
Jo, Jihyuck, et al. "DSIP: A scalable inference accelerator for convolutional neural networks." IEEE Journal of Solid-State Circuits 53.2 (2017): 605-618. (Year: 2017).*
Parashar, Angshuman, et al. "SCNN: An accelerator for compressed-sparse convolutional neural networks." ACM SIGARCH computer architecture news 45.2 (2017): 27-40. (Year: 2017).*
Gokhale, Vinayak, et al. "Snowflake: An efficient hardware accelerator for convolutional neural networks." 2017 IEEE International Symposium on Circuits and Systems (ISCAS). IEEE, 2017. (Year: 2017).*
U.S. Appl. No. 16/040,357, filed Jul. 19, 2018, Zhang, Xiaoqian et al., San Jose, CA USA.

\* cited by examiner

*Primary Examiner* — Benjamin P Geib
(74) *Attorney, Agent, or Firm* — Crawford Maunu PLLC

(57) ABSTRACT

Disclosed circuits and methods involve a first register configured to store of a first convolutional neural network (CNN) instruction during processing of the first CNN instruction and a second register configured to store a second CNN instruction during processing of the second CNN instruction. Each of a plurality of address generation circuits is configured to generate one or more addresses in response to an input CNN instruction. Control circuitry is configured to select one of the first CNN instruction or the second CNN instruction as input to the address generation circuits.

18 Claims, 11 Drawing Sheets

NEURAL NETWORK CONTROLLER

TECHNICAL FIELD

The disclosure generally relates to controllers for neural networks.

BACKGROUND

Processing circuitry, such as neural networks, provide solutions to a variety of different problems. Convolutional neural networks (CNNs), for example, may be used for image processing. CNNs can be implemented using Graphics Processing Units (GPUs) and use a batch processing approach to reduce computational costs by grouping a number of similar tasks and computing the group of tasks as a batch. A batch of tasks can be computed by using multiple streaming processor (SP) cores inside a scalable number of streaming multiprocessors (SMs) in parallel. The implementation costs of a controller of the GPU may be amortized over a number of tasks, however, the latency of the CNN will increase as the batch size increases because the GPU has to wait for all tasks to be ready before processing the tasks together in batch mode in order to maintain the computational efficiency of the CNN.

There are a variety of different circuits that can implement CNNs including, but not limited to, digital signal processors (DSPs), general purpose computer processors, programmable integrated circuits, programmable logic devices (PLDs), and System on Chip (SoC) devices. PLDs are a type of programmable integrated circuit (IC) that can be programmed to perform specified logic functions. One type of PLD, the field programmable gate array (FPGA), can include an array of programmable tiles. These programmable tiles comprise various types of logic blocks, which can include, for example, input/output blocks (IOBs), configurable logic blocks (CLBs), dedicated block random access memory (BRAM), multipliers, digital signal processing blocks (DSPs), processors, clock managers, delay locked loops (DLLs), bus or network interfaces such as Peripheral Component Interconnect (PCI), PCI Express (PCIe), Ethernet, and so forth. Some devices include enough components and functionality to effectively serve as an entire computer system on a single IC chip. Devices with such functionality are sometimes referred to as SoCs. Some SoC devices can include programmable logic that is similar to programmable logic provided by various PLDs.

Overhead processing can impede the performance of various implementations of CNNs. Context switching adds to computation time by delaying initiation of processing of one layer of the CNN when processing of the previous layer is complete. Zero padding of input feature maps (IFMs) adds extra storage requirements and also adds to computation time.

SUMMARY

A disclosed circuit arrangement includes a first register configured to store of a first convolutional neural network (CNN) instruction during processing of the first CNN instruction and a second register configured to store a second CNN instruction during processing of the second CNN instruction. The circuit arrangement further includes a memory arrangement and a plurality of address generation circuits. The address generation circuits are configured to generate addresses of data elements of an input feature map (IFM) and an output feature map (OFM) in response to an input CNN instruction. Control circuitry is configured to select one of the first instruction or the second instruction as input to the address generation circuits. Multiply-and-accumulate circuitry is configured to perform multiply-and-accumulate operations on the data elements of the IFM and a filter.

Another disclosed circuit arrangement includes a plurality of computation circuits 1 through M. Each computation circuit is configured to perform multiply-and-accumulate operations of a different layer of a convolutional neural network (CNN), and each computation circuit J for 1<J<=M is configured to compute a layer or multiple layers of the CNN based on output data from computation circuit J−1. A plurality of pairs of memory circuits are coupled between the computation circuits. Each pair of memory circuits includes a first memory circuit and a second memory circuit. Computation circuits K−1 and K are configured to concurrently write to and read from the first and second memory circuits of the respective pair during a first time interval, respectively, and concurrently write to and read from the second and first memory circuits during a successive second time interval, respectively. Each computation circuit includes respective address generation circuitry. The address generation circuitry includes a first register configured to store of a first CNN instruction during processing of the first CNN instruction and a second register configured to store a second CNN instruction during processing of the second CNN instruction. The address generation circuitry includes a plurality of address generation circuit configured to generate addresses of data elements of an input feature map (IFM) and an output feature map (OFM) in response to an input CNN instruction. Control circuitry is configured to select one of the first CNN instruction or the second CNN instruction as input to the address generation circuits.

A disclosed method includes storing a first convolutional neural network (CNN) instruction in a first register during processing of the first CNN instruction and storing a second CNN instruction in a second register during processing of the second CNN instruction. The method generates addresses of data elements of an input feature map (IFM) and an output feature map (OFM) in response to an input CNN instruction by a plurality of address generation circuits. Control circuitry selects one of the first instruction or the second instruction as input to the address generation circuits. The method includes performing multiply-and-accumulate operations on the data elements of the IFM and a filter by multiply-and-accumulate circuitry.

Other features will be recognized from consideration of the Detailed Description and Claims, which follow.

BRIEF DESCRIPTION OF THE DRAWINGS

Various aspects and features of the disclosed circuits and methods will become apparent upon review of the following detailed description and upon reference to the drawings in which.

DETAILED DESCRIPTION

Figure 1:
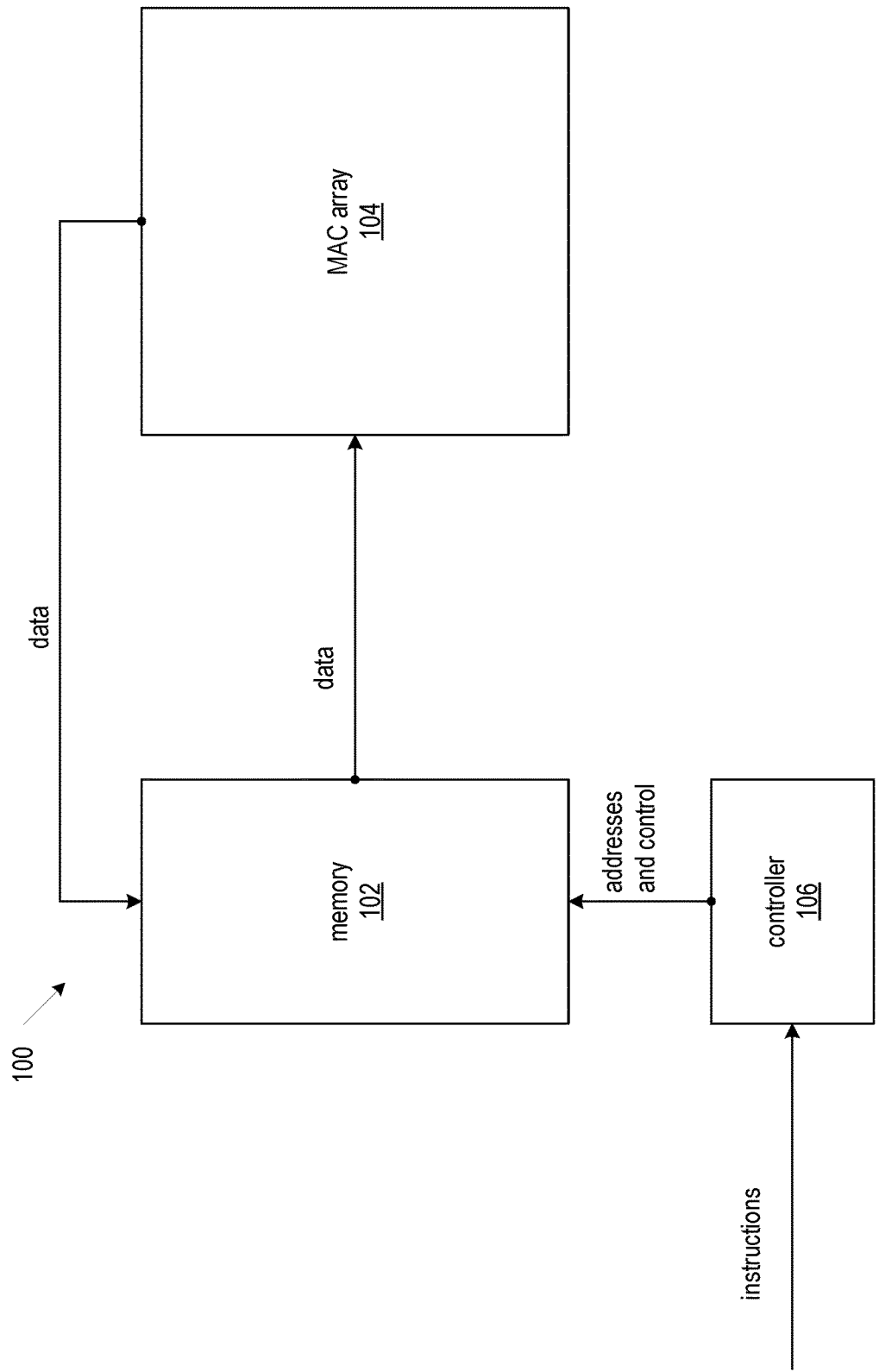
FIG. 1 shows a system in which a neural network controller can be implemented.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuits and methods improve the performance of a neural network by eliminating zero-padding computations. In addition, overhead processing associated with context switching is significantly reduced. In one aspect, mapping of output feature map (OFM) coordinates to input feature map (IFM) coordinates is performed by a pipeline of address generation circuits. Calculations involving zero-padding values are eliminated by generating different numbers of IFM elements based on the coordinates of the OFM elements.

In another aspect, multiple computation circuits are pipelined and implement successive layers of a CNN. Ping-pong memories are deployed between the computation circuits, which allows one computation circuit to write output tensor data to one of the ping-pong memories concurrent with the next computation circuit in the pipeline reading from the other one of the ping-pong memories.

Various ones of the disclosed circuits include first and second instruction registers and multiple address generation circuits. The first register stores a first instruction during processing of a first instruction stored therein, and the second register stores a second instruction during processing of a second instruction stored therein. Each of the address generation circuits generates one or more addresses in response to an instruction input from the first or second instruction registers. Control circuitry selects either of the first instruction or the second instruction as input to the address generation circuits.

Another implementation involves pipelined computation circuits that compute successive layers of a CNN. Each of the computation circuits includes respective address generation circuitry as described above. The pipelined computation circuits are coupled by ping-pong memories. Concurrent with one computation circuit writing output tensor data to one of the ping-pong memories, the next computation circuit in the pipeline reads tensor data from the other one of the ping-pong memories.

Figure 3:
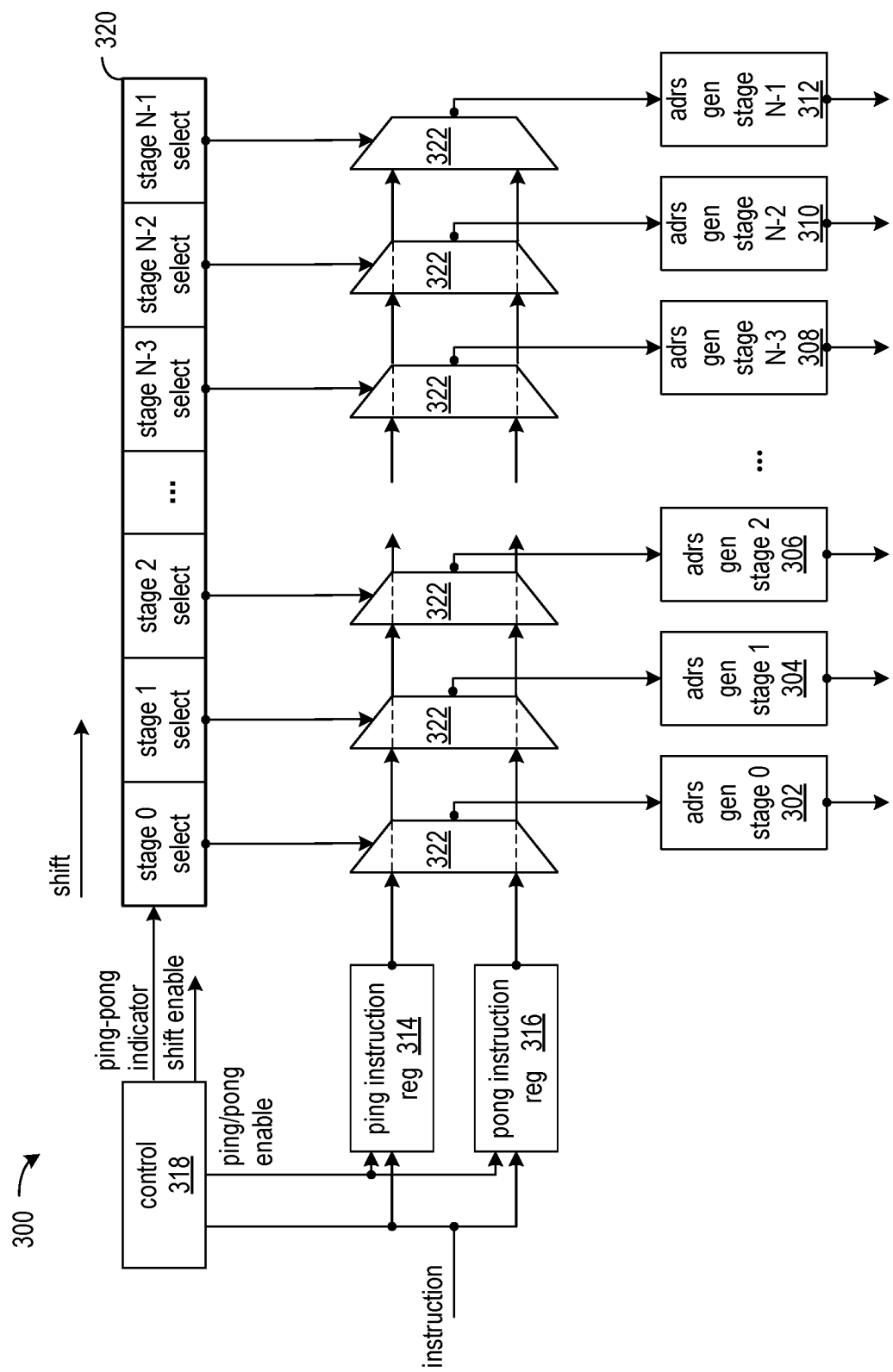
FIG. 3 shows an exemplary address generation pipeline.
Figure 7:
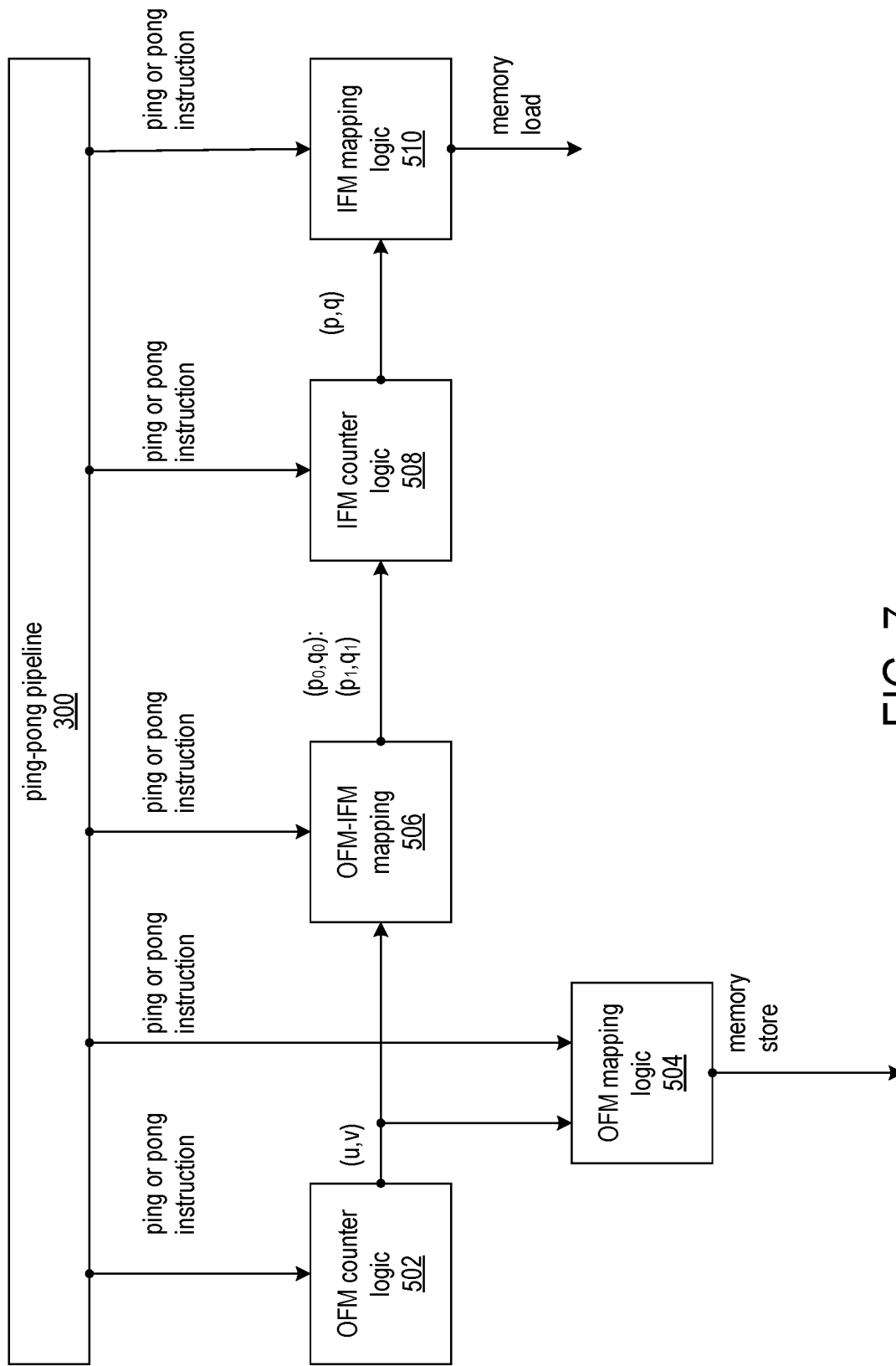
FIG. 7 shows address generation stages involved in mapping OFM coordinate pairs to sequences of addresses for reading data elements from the IFM.
Figure 8:
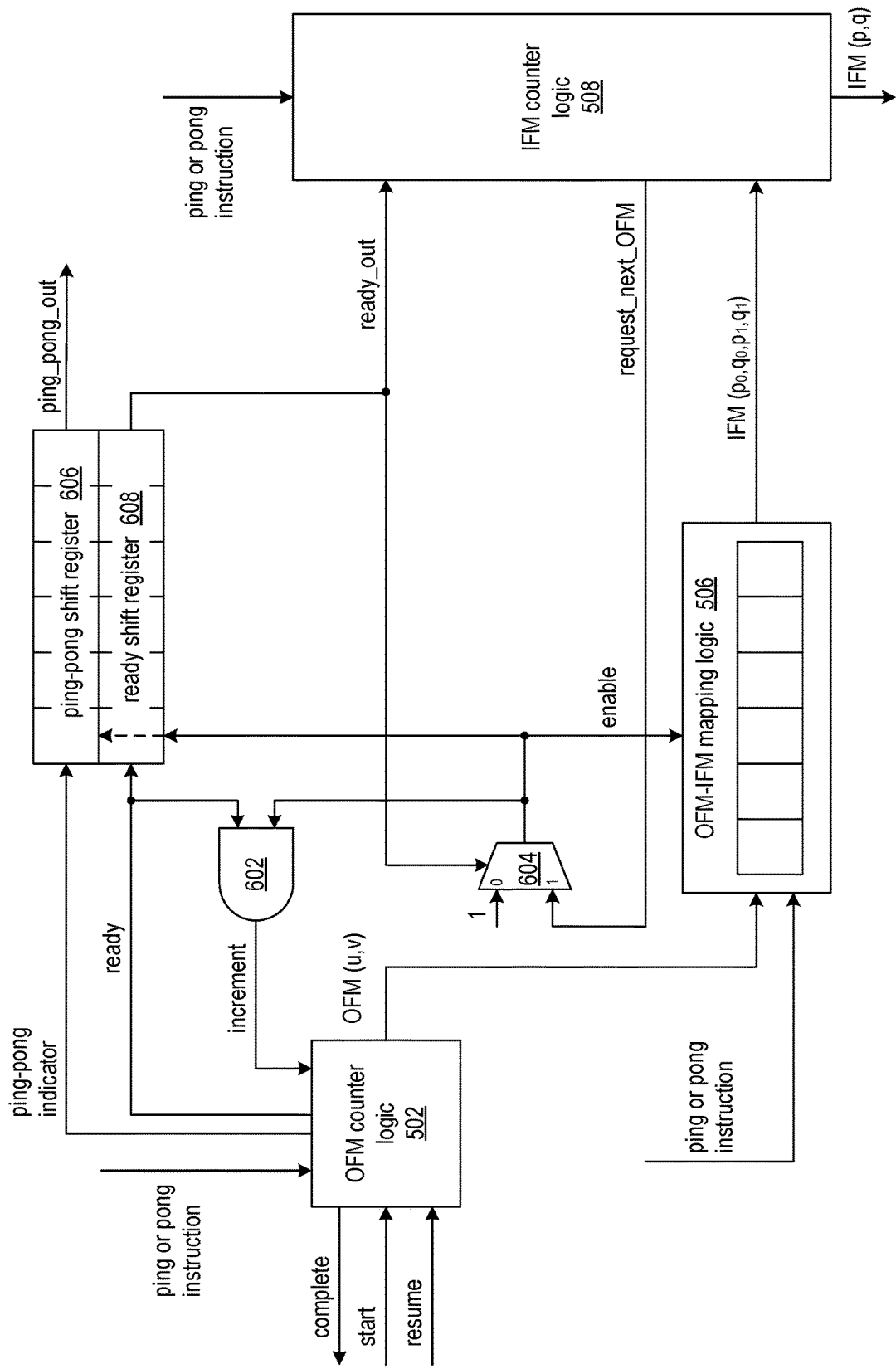
FIG. 8 shows circuitry for mapping OFM coordinate pairs to sequences of IFM coordinate pairs. Each OFM coordinate pair (u,v), maps to a sequence of IFM coordinate pairs $(p,q)_1, (p,q)_2, (p,q)_3, \ldots (p,q)_i$.

FIG. 1 shows a system in which a neural network controller can be implemented according to the circuits shown in FIGS. 3, 7, and 8. The system 100 includes a memory arrangement, an array of multiply-and-accumulate (MAC) circuits 104, and a controller 106. The memory arrangement can include one or more random access memory (RAM) circuits that are accessible to store data of input feature maps, output feature maps, and filters.

The controller 106 inputs CNN instructions. Exemplary CNN instructions include convolution, pooling, pre-pooler, and other CNN instructions. Along with an instruction code, each instruction includes various parameters used by the controller 106 in addressing the memory 102. In a convolution instruction, for example, the parameters indicate the dimensions (e.g., height, width, and depth) of the IFM, the dimensions of the OFM (e.g., height, width, and depth), the dimensions of the filter (e.g., height, and width), the stride, and the dimensions of zero-padding of the IFM. Similarly, a pooling instruction used in prepooler (pooling before convolution in inception) instruction includes parameters used by the controller in addressing the memory. The parameters indicate the dimensions of the IFM, the dimensions of the OFM, the dimensions of the filter, the stride, and the dimensions of zero-padding of the IFM.

Figure 9:
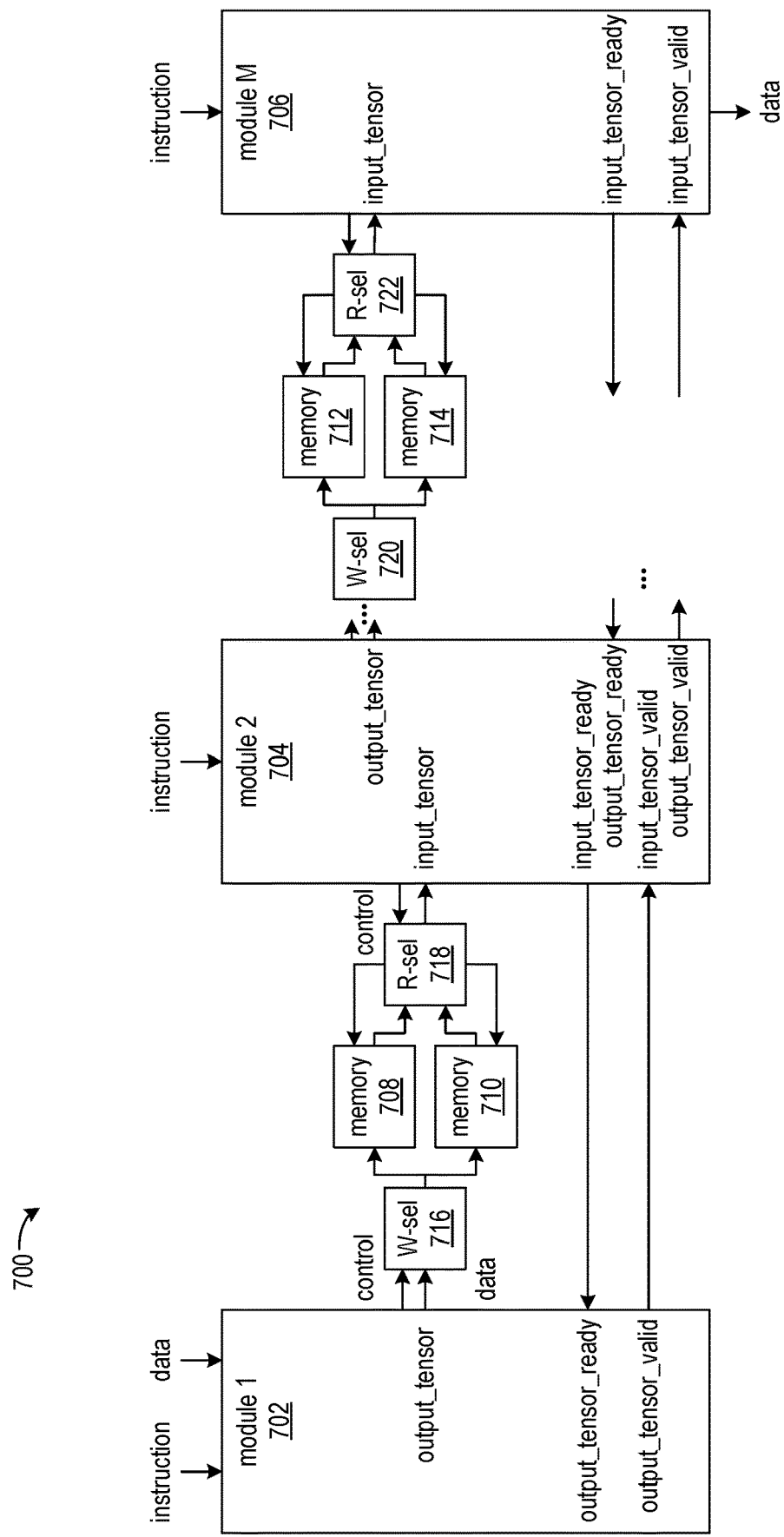
FIG. 9 shows a system having multiple modules that are coupled in a cascaded chain that can implement the layers of a neural network.

The MAC array 104 inputs the IFM, OFM, and filter from the memory, computes tensor data, and stores the resulting tensor data back in the memory 102. The system 100 can be configured to compute multiple layers of a CNN. Alternatively, the system 100 can be adapted to compute one layer of a CNN and multiple instances can be connected in a pipeline of computation circuits, as shown in FIG. 9.

Figure 2:
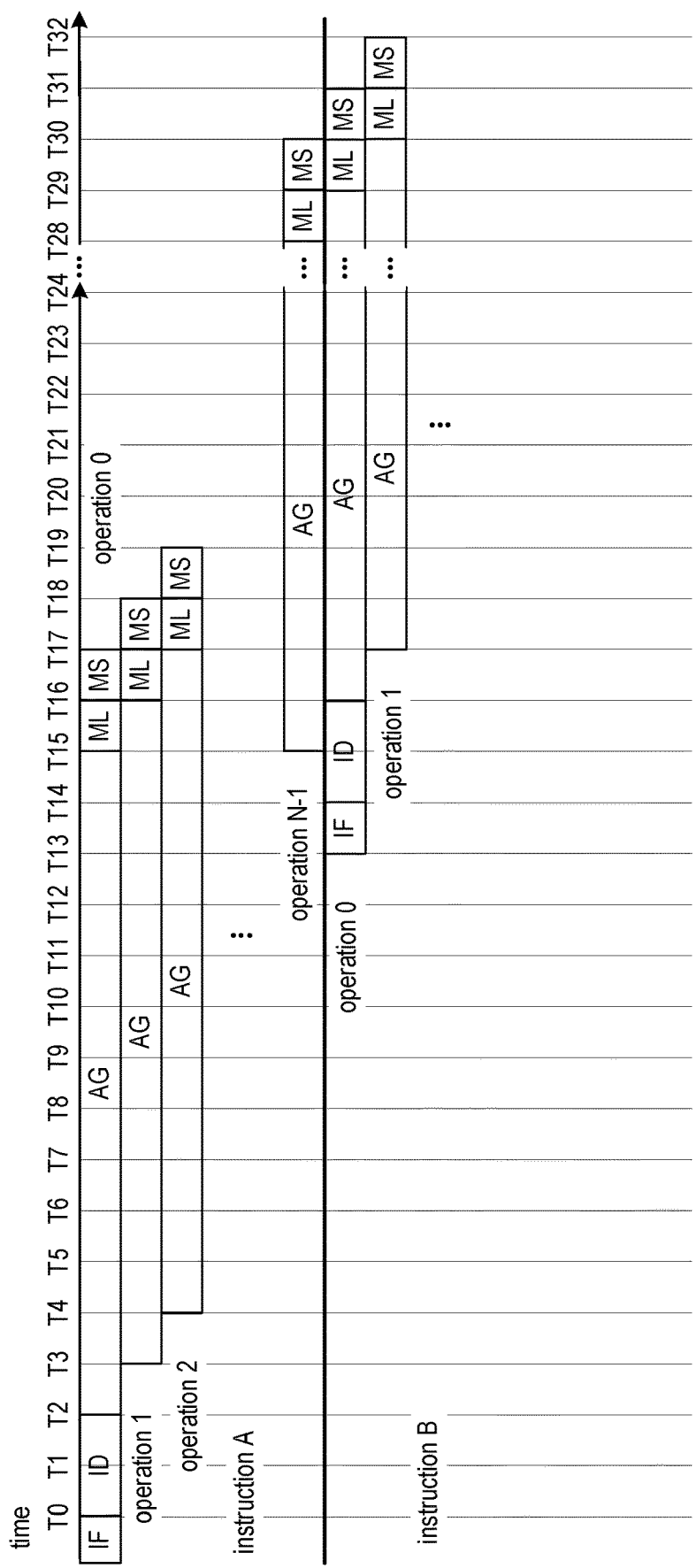
FIG. 2 shows a timing diagram of pipelined address generation in neural network instruction processing.

FIG. 2 shows a timing diagram of pipelined address generation in neural network instruction processing. The processing of each exemplary instruction involves one cycle to fetch the instruction ("IF"), two cycles to decode the instruction ("ID"), 13 cycles to generate addresses ("AG"), one cycle to load values from memory ("ML"), and one cycle to store results in memory ("MS"). Different instructions can have different numbers of operations, with the same number of cycles required for address generation within each operation. Exemplary instruction A has N operations denoted operation 0 through operation N-1. Two operations are shown for exemplary instruction B. Instruction B can have fewer, the same number, or more operations as instruction A, depending on the application.

The operations of an exemplary convolution instruction include multiply-and-accumulate operations. Each operation produces one OFM element based on multiple IFM elements and weights of a filter. The operations in a pooling instruction calculate the maximum value of multiple IFM elements within a sliding window that is defined by the pooling filter dimensions.

The overlapped address generation for different operations and instructions eliminates overhead in performing nested loop operations and eliminates the overhead in switching from processing one instruction to the next.

FIG. 3 shows an exemplary address generation pipeline. The address generation pipeline 300 includes multiple address generation stages numbered 0 through N-1, and the address generation stages are implemented by address generation circuits 302, 304, 306, ... 308, 310, and 312. The address generation stages 0 through N-1 correspond to the address generation stages shown in the timing diagram of FIG. 2.

The address generation circuits of the different stages compute coordinates of the OFM or IFM which are used in subsequent stages to compute a memory address, compute a memory load address for reading filter weights or IFM elements, or compute a memory store address for writing an OFM output value. The multiple address generation circuits compute coordinates/addresses in parallel.

Each of the address generation stages inputs an instruction from one of ping register 314 or pong register 316. The selection of which instruction is input is controlled by control circuit 318, shift register 320, and multiplexers 322. Some of the address generation stages can be generating addresses for an instruction in one of the ping/pong registers 314 and 316, while others of the stages are generating addresses for an instruction in the other of the ping-pong registers.

The required number of operations for each instruction is pre-determined. For example, the convolution instruction has a fixed number of operations and the pooling instruction has a different fixed number of operations. The control circuit 318 can decode an input instruction, select one of the ping register or the pong register for storing the input instruction, and hold a ping-pong indicator signal at a desired level for a number of shift cycles of shift register 320. The number of shift cycles for which the ping-pong indicator signal is held corresponds to the number of operations (see FIG. 2) required for the instruction. The control circuit alternately selects the instruction from the ping register 314 as input to a subset of the address generation circuits 302 through 312 for the number of consecutive address generation cycles required for the number of operations specified by the "ping" instruction, and selects the instruction from the pong register 316 as input to another subset of the address generation circuits 302 through 312 for the number of consecutive address generation cycles required for the number of operations of the "pong" instruction.

The exemplary circuit shows when an instruction is applied but not the timing for when an address is generated and output. For example, an OFM store address can be generated in a stage before the IFM addresses have been generated. However, the OFM address is not needed until after IFM read addresses are generated and the IFM data has been processed.

The exemplary address generation pipeline eliminates overhead in transitioning from processing one layer to the next layer, for example transitioning from processing one convolution instruction to processing another convolution instruction or transitioning from processing one pooling instruction to processing another pooling instruction. Some implementations can have a sequence of convolution instructions having parameters with different values. Similarly, pooling instructions in a sequence can have different parameter values. In transitioning from one layer to the next, address generation stages 0 through X are generating addresses for the ping instruction, concurrent with address generation stages X+1 through N−1 generating addresses for the pong instruction.

Figure 4:
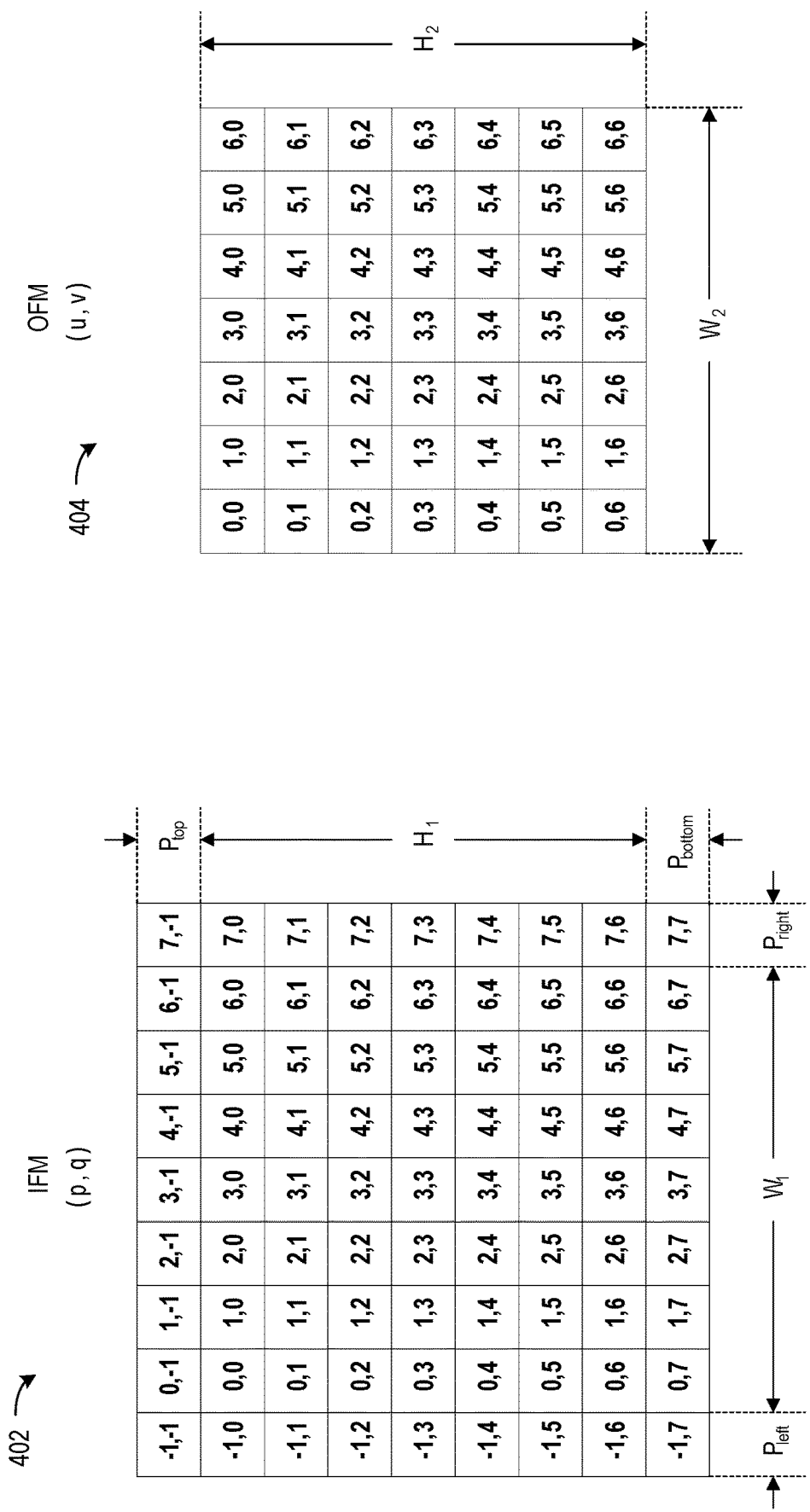
FIG. 4 shows an exemplary IFM and an exemplary OFM in which the IFM is zero-padded.
Figure 5:
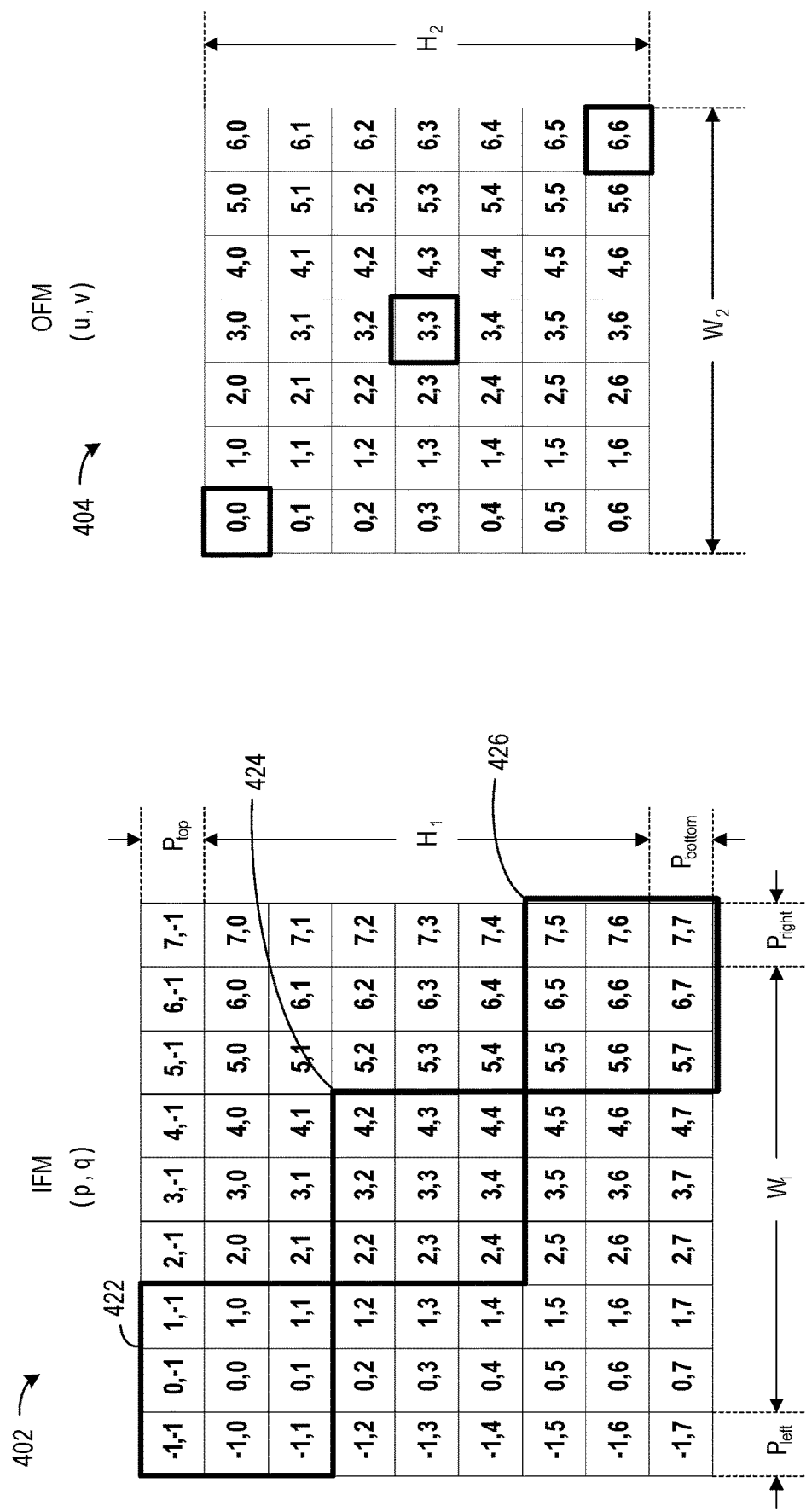
FIG. 5 shows the IFM and OFM of FIG. 4 and mappings from IFM sub-matrices containing multiple IFM elements (p,q) to the single OFM elements (u,v) generated from the IFM sub-matrices and filter.
Figure 6:
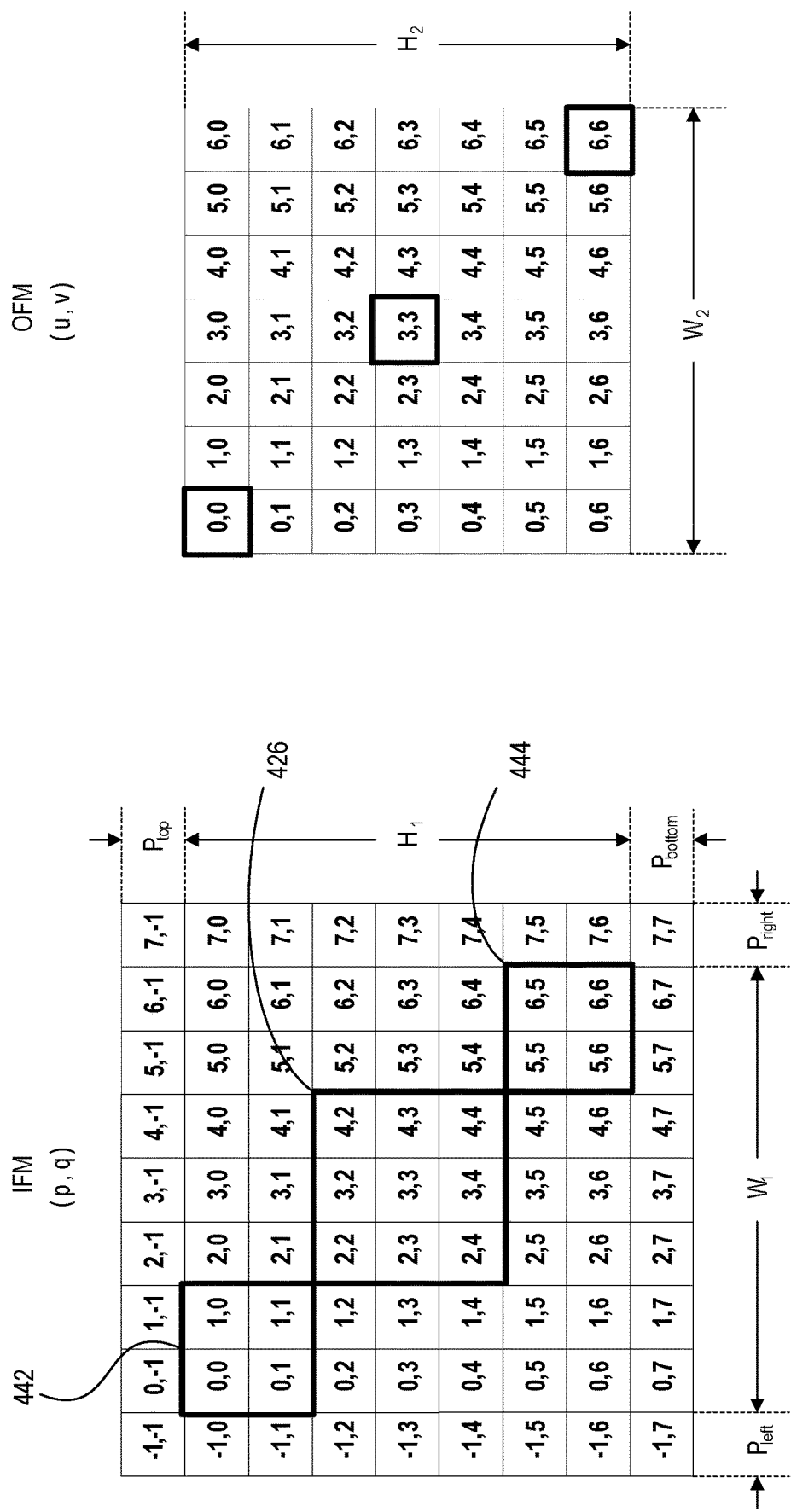
FIG. 6. shows the IFM and OFM of FIG. 4 and projections from variable size IFM sub-matrices to single OFM elements.

FIGS. 4, 5, and 6 show an example of how the disclosed circuitry avoids processing of zero-padding in IFMs. As multiplication by zero results in zero, the zero result adds nothing to the accumulated value. Thus, MAC cycles involving zero padding are wasted. The disclosed circuits eliminate MAC processing of zero padding by producing variable size IFM sub-matrices for input to the MAC array.

FIG. 4 shows an exemplary IFM 402 and an exemplary OFM 404 in which the IFM is zero-padded. The labels in elements of the matrices indicate column-row coordinate pairs of the elements. An IFM coordinate is indicated by (p,q), and (p,q)=(0,0) is the upper left element and (p,q)= (6,6) is the lower right element of the original 7×7 IFM. An OFM coordinate is indicated by (u,v).

The size of exemplary IFM 402 is $H_1=7$ and $W_1=7$. The size of exemplary OFM 404 is $H_2=7$ and $W_2=7$. The size of the exemplary 2-D convolution filter kernel, the effects of which will be illustrated in FIG. 5, is $F_x=3$ $F_y=3$, in which $F_x$ is the height, and $F_x$ is the width. The stride is $S_x=1$ and $S_y=1$.

To produce the OFM of the desired size, horizontal zero padding ($P_x$) and vertical zero padding ($P_y$) are added to the IFM 402 to satisfy the equations:

$$H_1+P_x=F_x+(H_2-1)\cdot S_x$$

$$W_1+P_y=F_y+(W_2-1)\cdot S_y$$

Zero padding on all four sides extends the IFM to a size of 9×9. With a sliding kernel size equal to 3×3 window ($F_x=3$ $F_y=3$) and stride size equal to 1 ($S_x=1$ $S_y=1$) moving from left to right and top to bottom, a 7×7 OFM with coordinates (u,v) is generated. The horizontal zero padding ($P_x$) can be divided into left zero padding ($P_{left}$) and right zero padding ($P_{right}$), and the vertical zero padding can be divided into top zero padding ($P_{top}$) and bottom zero padding ($P_{bottom}$) as shown by the following equations:

$$P_x=P_{left}+P_{right}$$

$$P_y=P_{top}+P_{bottom}$$

In the example, the padding values are:
$P_{left}=1$
$P_{top}=1$
$P_{right}=1$
$P_{bottom}=1$ FIG. 5 shows the IFM and OFM of FIG. 4 and mappings from IFM sub-matrices containing multiple IFM elements (p,q) to the single OFM elements (u,v) generated from the IFM sub-matrices and filter. OFM element (0,0) is generated from IFM sub-matrix 422, OFM element (3,3) is generated from IFM sub-matrix 424, and OFM element (6,6) is generated from IFM sub-matrix 426. Conventional 2D convolution approaches employ zero padding to extend the original IFM for projection from a fixed number of IFM elements to a single OFM element, and a fixed size sliding window is used as well for arithmetic operations. However, zero padding does not contribute to the final convolution values.

In generating OFM (0,0), only four of the nine elements of IFM sub-matrix 422 are useful for MAC operations, and the other five IFM elements are zero-padding values that are unnecessary for computing OFM (0,0). According to prior approaches, OFM element (0,0) is generated by the IFM sub-matrix 422 having 9 IFM elements with coordinates (p,q)=(−1,−1), (0,−1), (1,−1), (−1,0), (0,0), (1,0), (−1,1), (0,1), (1,1). Five of the nine elements are left and top zero padding values outside of original H1*W1 IFM. Those five IFM elements are (−1,1), (0,−1), (1,−1), (−1,0), (−1,1). Only IFM elements (0,0), (1,0), (0,1), (1,1) actually contribute to the accumulation of the value for OFM (0,0). The computation of OFM (6,6) is similar, with zero-padding on the bottom and right of the IFM 402.

FIG. 6. shows the IFM and OFM of FIG. 4 and projections from variable size IFM sub-matrices to single OFM elements. The variable size sub-matrices are shown as sub-matrix 442, sub-matrix 426, and sub-matrix 444.

OFM element (0,0) is mapped to the IFM sub-matrix 442 bounded by upper left corner and lower right corner, denoted $((p_0,q_0), (p_1,q_1))=((0,0), (1,1))$. The following notation is referenced below in describing the IFM-to-OFM mapping:

$$f_{IFM,UL}(0,0)=(p_0,q_0)=(0,0)$$

$$f_{IFM,LR}(0,0)=(p_1,q_1)=(1,1)$$

OFM element (6,6) is mapped to the IFM sub-matrix bounded by upper left corner and lower right corner $((p_0,q_0), (p_1,q_1))=((5,5), (6,6))$. The boundaries of the IFM sub-matrix are:

$$f_{IFM,UL}(6,6)=(p_0,q_0)=(5,5)$$

$$f_{IFM,LR}(6,6)=(p_1,q_1)=(6,6)$$

The sub-matrices 442 and 444 exclude the zero padding outside the original IFM (H1×W1). By excluding the zero padding, MAC operations involving the zero padding values can be avoided, thereby enabling those MAC cycles to be used instead for calculations involving IFM elements that are not zero padding.

The computation of OFM element (3,3) is different from the computation of OFM elements (0,0) and (6,6). The size of sub-matrix 426 in the middle of the IFM is larger than the size of sub-matrices 442 and 444. OFM (3,3) is mapped to IFM sub-matrix 426 bounded by left corner and lower right corner $((p_0,q_0), (p_1,q_1))=((2,2), (4,4))$. The boundaries of the IFM sub-matrix are:

$$f_{IFM,UL}(3,3)=(p_0,q_0)=(2,2)$$

$$f_{IFM,LR}(3,3)=(p_1,q_1)=(4,4)$$

In some neural networks, as the layer number increases, the base IFM size becomes smaller ($H_1 \times W_1$) but deeper. Thus, compared to a larger size IFM, the boundary IFM elements in smaller size IFMs occupy a larger portion of the total IFM elements, and more zero padding is present. The disclosed circuits and methods can achieve increasing efficiency as the size of IFMs decreases.

FIG. 7 shows address generation stages involved in mapping OFM coordinate pairs to sequences of addresses for reading data elements from the IFM. The counter and mapping logic circuits correspond to separate ones of the address generation stages shown in FIG. 3. Thus, in generating the IFM memory load addresses, some address generation circuits compute coordinate pairs that are fed forward to the next address generation circuit.

Instructions are input to the address generation circuits 502, 504, 504, 506, 508, and 510 by the address generation pipeline circuit 300 (FIG. 3). The instructions input to the logic circuits can be different, such as when the ping instruction register is indicated by some bits of the stage selection shift register 320 (FIG. 3) and the pong instruction register is indicated by other bits of the stage selection shift register.

The address generation circuits include OFM counter logic 502, OFM mapping logic 504, OFM-IFM mapping logic 506, IFM counter logic 508, and IFM mapping logic 510. The OFM counter logic uses the OFM height and width parameters of the input instruction to generate a sequence of OFM (u,v) coordinate pairs. The dimensions of the OFM as provided in the input instruction are used to generate the OFM (u,v) coordinate pairs. Each OFM (u,v) coordinate pair output by the OFM counter logic is provided as input to the OFM mapping logic 504 and to the OFM-IFM mapping logic 506.

The OFM mapping logic 504 uses the OFM (u,v) coordinate pair and the convolver destination parameter from the input instruction to generate the memory store address. Though the memory store address to the OFM is not needed until after the memory load address has been issued and the IFM data elements have been processed, the memory store address in some implementations may be generated in a stage prior to the stage in which the IFM memory load address is generated. As the memory store is not needed until after the memory load address, the proper timing can be handled in one of two ways. In one approach, the OFM memory store address can be generated in a stage before the IFM memory load address is generated, and the OFM memory store address can be delayed until after the IFM memory load address is generated and the IFM data elements are processed. In an approach in which the OFM memory store address is generated in a stage after the stage that generates the IFM memory load address, the (u,v) OFM coordinate pair and some fields from the ping/pong instruction required for OFM store address generation are extracted in a stage prior to generating the IFM memory load address, but output of the memory store address is delayed until after the IFM memory load operations are complete.

Using the input OFM (u,v) coordinate pair and the IFM dimensions, filter size, and stride indicated by the parameters in the input instruction, the OFM-IFM mapping logic 506 determines boundaries of the IFM sub-matrix. The OFM-IFM mapping logic 506 maps each OFM (u,v) coordinate pair to an upper-left IFM coordinate pair $(p_0,q_0)$ and to lower-right IFM coordinate pair $(p_1,q_1)$. The coordinate pairs $(p_0,q_0)$ and $(p_1,q_1)$ indicate the bounds of the IFM sub-matrix used to compute the value at the OFM (u,v) coordinate pair.

The IFM counter logic 508 generates a sequence of IFM (p,q) coordinate pairs in response to parameters of the input instruction and IFM sub-matrix boundaries $(p_0,q_0)$ and $(p_1,q_1)$. The IFM counter logic avoids generating (p,q) coordinate pairs that reference zero padding elements of the IFM by responding to the particular parameters and IFM sub-matrix boundaries. For example, in response to the IFM sub-matrix boundaries (−1,−1) and (1,1), (as shown in FIG. 5), the IFM counter logic can generate the sequence of IFM coordinate pairs (0,0), (1,0), (0,1), and (1,1) as shown in FIG. 6, thereby avoiding zero padding values of the sub-matrix.

The parameters from the input instruction to the IFM counter logic are used by the IFM counter logic to control scheduling of computation and output of the IFM coordinate pairs. For example, one convolution operation can be performed by multiple computation circuits operating in parallel, requiring multiple IFM elements to be read in parallel. Alternatively, a convolution operation can be performed by a single computation circuit, which would require a different scheduling of IFM coordinate pairs.

The IFM mapping logic 510 computes a memory load address based on the input IFM (p,q) coordinate pair and an IFM base address provided by the input instruction.

FIG. 8 shows circuitry for mapping OFM coordinate pairs to sequences of IFM coordinate pairs. Each OFM coordinate pair (u,v), maps to a sequence of IFM coordinate pairs $(p,q)_1, (p,q)_2, (p,q)_3, \ldots (p,q)_r$. For each OFM (u,v) output by OFM counter logic 502, the OFM-IFM mapping logic 506 generates the boundaries of an IFM sub-matrix IFM $(p_0,q_0,p_1,q_1)$, and from the IFM submatrix, the IFM counter logic 508 generates a sequence of IFM coordinate pairs $(p,q)_1, (p,q)_2, (p,q)_3, \ldots (p,q)_r$. The ping-pong shift register 606, ready shift register 608, AND gate 602, multiplexer 604 and the associated signals are used to control the generation of the sequence of IFM coordinate pairs $(p,q)_1$, $(p,q)_2$, $(p,q)_3$, . . . $(p,q)_t$ for each OFM $(u,v)$ coordinate pair. Ping-pong shift register 606 and ready shift register 608 comprise the shift register 320 of FIG. 3.

After reset and when ready_out='0' from the read shift register 608, a new OFM $(u,v)$ coordinate pair from the OFM counter logic is shifted-in to the OFM-IFM mapping logic 506, because ready_out='0' selects the logic '1' at the 0-input of multiplexer 604. The ready signal input to shift register 608 is logic 1 at this time because OFM elements are assumed to be always ready for processing initially. Then the output of AND gate 602 is forced to logic 1, signaling the OFM counter logic 502 to increment to the next OFM element. At the same time the output from multiplexer 604 is held at logic 1 to enable shifting of shift registers 606 and 608 and shifting by the OFM-IFM mapping logic 506 until ready_out is logic 1, forcing multiplexer 604 to select the request_next_OFM pulse signal which is back-pressured by the IFM counter logic 508. When ready_out is logic 1, shift registers 606 and 608 and OFM-IFM mapping logic 506 are shifted and OFM counter logic 502 increments the coordinate pair $(u,v)$ only when the request_next_OFM pulse is asserted. In response to ready_out equal to logic 1 shifted out of ready shift register 608, the multiplexer selects the request_next_OFM signal, which is output from IFM counter logic 508. The request_next_OFM signal controls (enables/disables) shifting-in of the next OFM $(u,v)$ coordinate pair to the OFM-IFM mapping logic. The IFM counter logic dynamically responds to different sizes of IFM sub-matrices and signals that a new OFM $(u,v)$ coordinate pair can be shifted-in to the OFM-IFM mapping logic.

The OFM counter logic 502 computes a new coordinate pair $(u,v)$ in response to assertion of the increment signal from the AND gate 602, which is triggered by a logic 1 pulse of the request_next_OFM signal. The AND gate has inputs of the output signal from multiplexer 604 and the ready signal from the OFM counter logic. The OFM counter logic asserts the ready signal in response to assertion of the start signal. The ready signal indicates that an OFM coordinate pair $(u,v)$ is ready for processing. If no pulse of the resume signal is triggered before the complete signal is asserted, the OFM counter logic waits for the pulse of the resume signal to indicate that the next instruction for the next layer is ready for processing. The wait indicates that there is a bubble between the successive layers. If a pulse of the resume signal is triggered before the complete signal is asserted, the ready signal remains asserted and there is no bubble between the successive layers.

The outputs of the ping-pong shift register 606 indicates switches between processing of the ping and pong instructions for different address generation stages, such as to the OFM-IFM mapping logic 506 and the IFM counter logic 508.

In response to the input of a new ping or pong instruction and assertion of the start signal, the OFM counter logic 502 initiates generation of OFM coordinate pairs. The range of values of the coordinate pairs depend on the dimensions of the OFM indicated by the input instruction. The order in which the coordinate pairs are generated are implementation dependent. For example, the sequence can be row-major order. The depth dimension can be used to control scheduling by the OFM counter logic, OFM-IFM mapping logic, and IFM counter logic in space and time domains for parallel or sequential implementations of computation circuitry.

The OFM-IFM mapping logic 506 can eliminate zero-padding from some IFM sub-matrices and generate other IFM sub-matrices having a size that corresponds to the size of the filter size. The OFM-IFM mapping logic 506 maps an input OFM coordinate pair $(u,v)$ to an IFM sub-matrix $(p_0,q_0,p_1,q_1)$ over multiple cycles. The blocks represent several pipeline stages that compute the mapping with intermediate results passed from one stage to the next stage in the pipeline logic. The OFM-IFM mapping logic computes each IFM sub-matrix IFM $(p_0,q_0,p_1,q_1)$ based on the OFM coordinate pair $(u,v)$, the zero padding (i.e., left $P_{left}$, $P_{right}$, $P_{top}$, $P_{bottom}$), IFM dimensions, filter size, and stride.

The IFM counter logic 508 generates a sequence of IFM coordinate pairs $(p,q)_2$, $(p,q)_3$, . . . $(p,q)_t$ in response to the boundaries of the IFM sub-matrix $(p_0,q_0,p_1,q_1)$. For example, with reference to the example shown in FIG. 6, in response to the IFM sub-matrix (0,0,1,1), the IFM counter logic generates the following sequence of IFM coordinate pairs: (0,0), (1,0), (0,1), (1,1). In response to the IFM sub-matrix (2,2,4,4), the IFM counter logic generates the following sequence of IFM coordinate pairs: (2,2), (3,2), (4,2), (2,3), (3,3), (4,3), (2,4), (3,4), (4,4). In response to the IFM sub-matrix (5,5,6,6), the IFM counter logic generates the following sequence of IFM coordinate pairs: (5,5), (6,5), (5,6), (6,6).

FIG. 9 shows a system 700 having multiple modules that are coupled in a cascaded chain that can implement the layers of a neural network. Each of the modules 1 through M is a computation circuit that implements a layer or multiple layers of a neural network, and each computation circuit includes the circuitry of FIG. 1 and instances of the pipelining circuitry shown in FIGS. 3, 7, and 8. Module 1 is shown as block 702, module 2 is shown as block 704, and module M is shown as block 706.

The output tensor data generated by each module is processed as input tensor data by the next module in the chain, except for the output tensor data from the last module, module M. The output tensor data from module 1 is the input data to module 2, the output tensor data from module 2 is the input data to module 3, . . . , and the output tensor data from module M−1 is the input data to Module M.

Ping-pong tensor buffers are coupled between cascaded pairs of modules so that while one module of a cascaded pair is writing to one of the ping-pong buffers, the other module of the cascaded pair can be reading from the other one of the ping-pong buffers. The ping-pong tensor buffers are implemented as respective memory circuits. For example, memory circuits 708 and 710 implement the ping-pong tensor buffers between module 1 and module 2. Memory circuits 712 and 714 implement the ping-pong tensor buffers between module M−1 (not shown) and module M.

Modules K and K−1 of the M modules concurrently write to and read from first and second ones of the ping-pong tensor buffers during a first time interval, respectively, and during a successive time interval modules K and K−1 concurrently write to and read from the second and first ones of the ping-pong tensor buffers, respectively. For example, module 1 writes to memory circuit 708 concurrent with module 2 reading from memory circuit 710. In response to module 1 completing output of tensor data to memory circuit 708 and module 2 completing processing of the tensor data in memory circuit 710, module 1 can switch to writing output tensor data to memory circuit 710 and module 2 can switch to reading output tensor data from memory circuit 708.

The modules are coupled to write selection circuitry that controls writing output tensor data to the ping-pong buffers. The modules are also coupled to read selection circuitry that controls reading data from the ping-pong buffers. For example, module 1 is coupled to write selection circuit 716, and module 2 is coupled to read selection circuit 718. Similarly, module M−1 (not shown) is coupled to write selection circuit 720, and module M is coupled to read selection circuit 722.

The modules implement a read-valid interface that controls switching between reading from and writing to the ping-pong buffers. Consider a module K−1 sending a data tensor to module K. Module K−1 writes into one of the two tensor ping-pong buffers in $\{X_0^{(K)}, X_1^{(K)}\}$, and module K reads from the other one of the ping-pong buffers.

Module K tracks which of the two buffers $X_i^{(K)}$, $i \in \{0,1\}$ that the incoming tensor should be written into. From the perspective of module K, tensor elements flow from module K−1 to buffer $X_i^{(K)}$, $i \in \{0, 1\}$ when and only when: a) module K sets its internal state input_tensor_page to i; b) module K asserts input_tensor_rdy; and c) module K−1 asserts input_tensor_vld.

Figure 10:
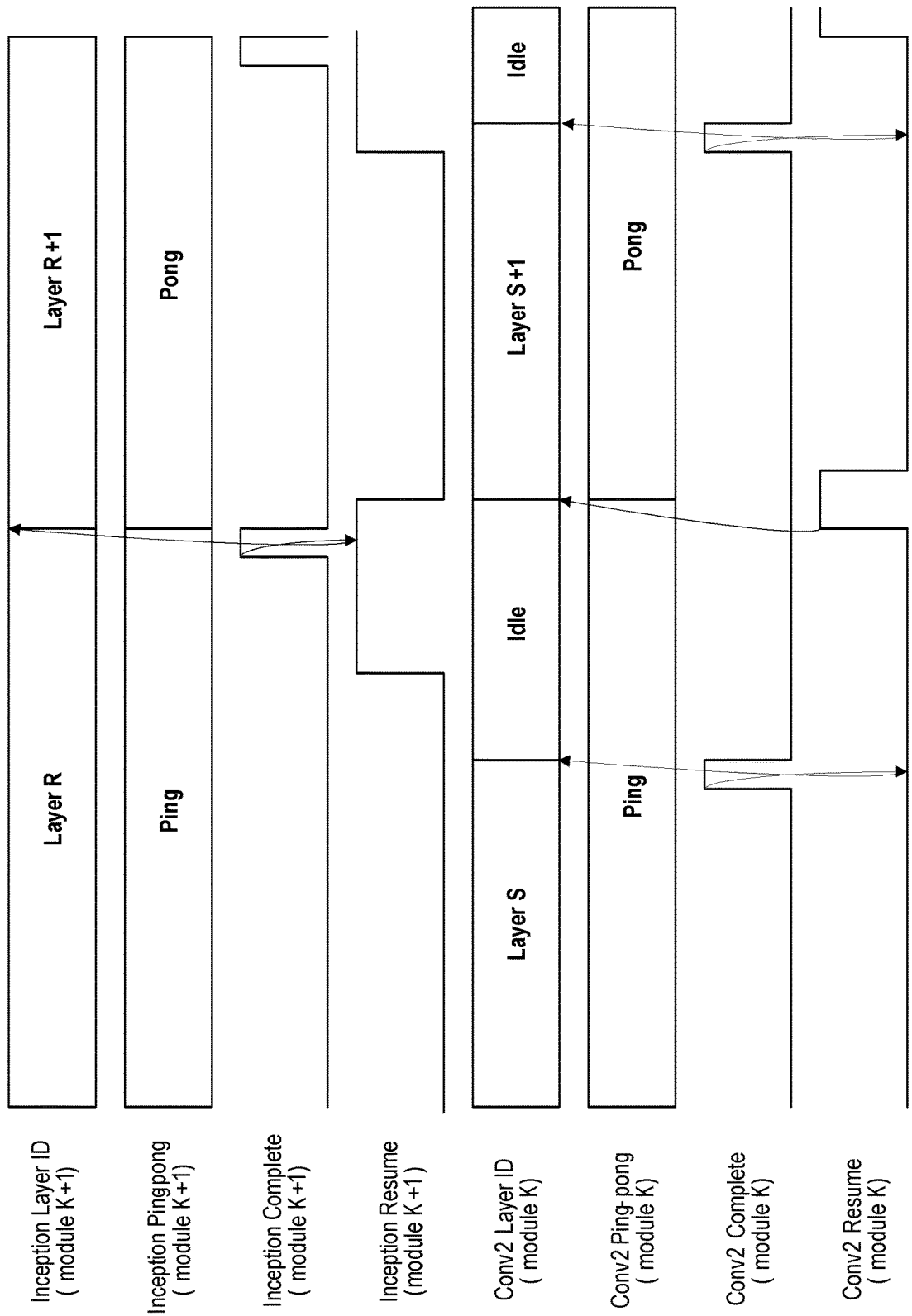
FIG. 10 shows an exemplary timing diagram of inception computation circuit (module K+1) cascaded with a conv2 computation circuit (module K)

FIG. 10 shows an exemplary timing diagram of inception computation circuit (module K+1) cascaded with a conv2 computation circuit (module K). The inception computation requires more cycles than the conv2 computation. After layer R of the inception computation is complete as indicated by the Inception Complete signal, the inception computation circuit checks the Inception Resume signal at the rising edge of the Inception Complete signal. Because the Inception Resume signal is asserted at this time, the inception computation circuit switches to layer R+1 processing.

The conv2 computation circuit requires fewer cycles than inception, and after layer S is finished by indication of the Conv2 Complete signal, the conv2 computation circuit checks the Conv2 Resume signal at the rising edge of the Conv2 Complete signal. Because Conv2 Resume is de-asserted at this time, the Conv2 computation circuit switches to an idle state and waits for the inception computation circuit. After the inception computation circuit finishes layer R, the inception computation circuit asserts the input_tensor_rdy signal (FIG. 9) to flip the resume signal (FIG. 8) to the conv2 computation circuit. The rising edge of the resume signal to the conv2 computation circuit triggers the conv2 computation circuit to switch from the idle state to layer S+1.

Address generation is stalled during idle period for the conv2 computation circuit, because the conv2 computation circuit must wait until the inception computation circuit processor releases a ping-pong buffer. Within a computation circuit, the address generation can also be stalled because of a rate mismatch between IFM counter logic and the OFM counter logic. The following example illustrates.

In response to de-assertion of a reset signal, the OFM counter logic 502 (FIG. 8) asserts the ready signal, and the request_next_ofm signal "is de-asserted, forcing both the ready_out signal enable signal to be 1 and enabling both the ready shift register 608 and IFM-OFM mapping logic 506. Because the ready_out signal from the ready shift register is initially de-asserted, multiplexer 604 selects constant 1 input and the increment signal to the OFM counter logic asserted. In response, the OFM counter logic is increment the OFM coordinate pair (u,v), such as in a row major (0,0), (1,0) . . . (6,0), (1,0), (1,1) . . . (6,6) order. After the number of cycles which that is the pipeline depth (depth of ping-pong shift register 606, depth of ready shift register 608, and depth of OFM-IFM mapping logic), the pipeline of the IFM-OFM mapping logic shift registers are filled and the ready_out signal is asserted, and the first IFM bounding box coordinate-pairs $((p_0,q_0), (p_1,q_1))=((0,0), (1,1))$ corresponding to the first OFM element (u,v)=(0,0) appear up at output of the IFM-OFM mapping logic pipeline.

Because the IFM counter logic 508 needs 4 cycles to generate the sequence of IFM coordinate pairs (0,0), (1,0), (0,1), (1,1) for the first bounding box (non-zero padded), the IFM counter logic does not assert the request_next_ofm signal until the IFM counter logic switches to the next bounding box and the ready_out signal=1 makes multiplexer 604 switch from input of the constant 1 signal to the request_next_OFM signal, which is de-asserted at this time. De-assertion of the increment signal suspends the OFM counter logic from incrementing the OFM coordinate pair (u,v), and also suspends the IFM-OFM mapping logic. If the IFM-OFM mapping logic and shift registers 606 and 608 have depth of 7, in this case bounding box coordinate-pairs are pipelined in the IFM-OFM pipeline as the sequence (u,v)=(0,0), (1,0), (2,0), (3,0), (4,0), (5,0), (6,0), after the first bounding box is finished, IFM counter logic will assert the request_next_ofm signal again, which will enable IFM-OFM mapping logic pipeline, shift registers, and OFM counter logic.

When the OFM counter logic 502 reaches the end of a layer, the complete signal is asserted, and the OFM counter logic checks the state of the resume signal. If the resume signal is asserted at this time, as illustrated for an inception computation circuit, the ready signal is still asserted, continuing counting by the OFM counter logic, and enabling the shift registers 606, 608, and the IFM-OFM mapping logic pipeline 506. This demonstrates that there is no bubble in between one layer and another layer.

If the Conv2 Resume signal is de-asserted, the ready signal will be de-asserted as well and that signal state shifted-in to shift register ready shift register 608. De-assertion of the resume signal also suspends incrementing by the OFM counter logic 502. Shift registers 606 and 608 and the IFM-OFM mapping logic pipeline are still enabled at this time, because there are still 7 IFM bounding boxes corresponding to 7 OFM elements (assuming pipeline depth=7) remaining in the pipeline, and the ready_out signal causes multiplexer 604 to select the request_next_ofm signal from the IFM counter logic 508 to drive the IFM-OFM mapping logic pipeline and shift registers 606 and 608. After the OFM counter logic 502 reaches the end of a layer if the next layer is not ready for processing as indicated by the resume signal at logic 0, the OFM counter logic deasserts the ready signal to logic 0, and the IFM-OFM mapping logic pipeline and shift registers are empty and the ready_out signal will be de-asserted because the de-asserted ready_in signal has shifted through the ready shift register 608. De-assertion of the ready_out signal forces the IFM counter logic to de-assert the request_next_ofm signal and causes the multiplexer 604 to select the constant 1 input, which enables the shift registers 606 and 608 and the IFM-OFM mapping logic pipeline. However, the signal ready signal at logic 0 is shifted-in and nonsense values for the OFM coordinate pair (u,v) are shifted in because the OFM logic is not incrementing. By this time, the IFM-OFM mapping logic pipeline and shift registers are flushed and the ready_out signal is always de-asserted and won't trigger the IFM counter logic to increment again. In this case, there are bubbles in between one layer and the next layer, and the conv2 computation circuit must wait for the downstream inception computation circuit to finish.

The downstream inception computation circuit releases the current input tensor buffer $X_i^{(K)}$, $i \in \{0,1\}$ by asserting the input_tensor_rdy signal (FIG. 9) and asserting the resume signal to the conv2 computation circuit after the inception computation circuit finishes one layer and moves to the next layer. The rising edge of the resume signal forces assertion of the ready signal from the OFM counter logic 502, which causes ready_in=1 to be shifted-in to ready shift register 608, incrementing the OFM coordinate pair (u,v) by the OFM counter logic, and shifting-in of the OFM coordinate pair (u,v) to the IFM-OFM mapping logic pipeline 506. After all bubbles are shifted out, the IFM counter logic 508 can move to the next IFM layer.

Figure 11:
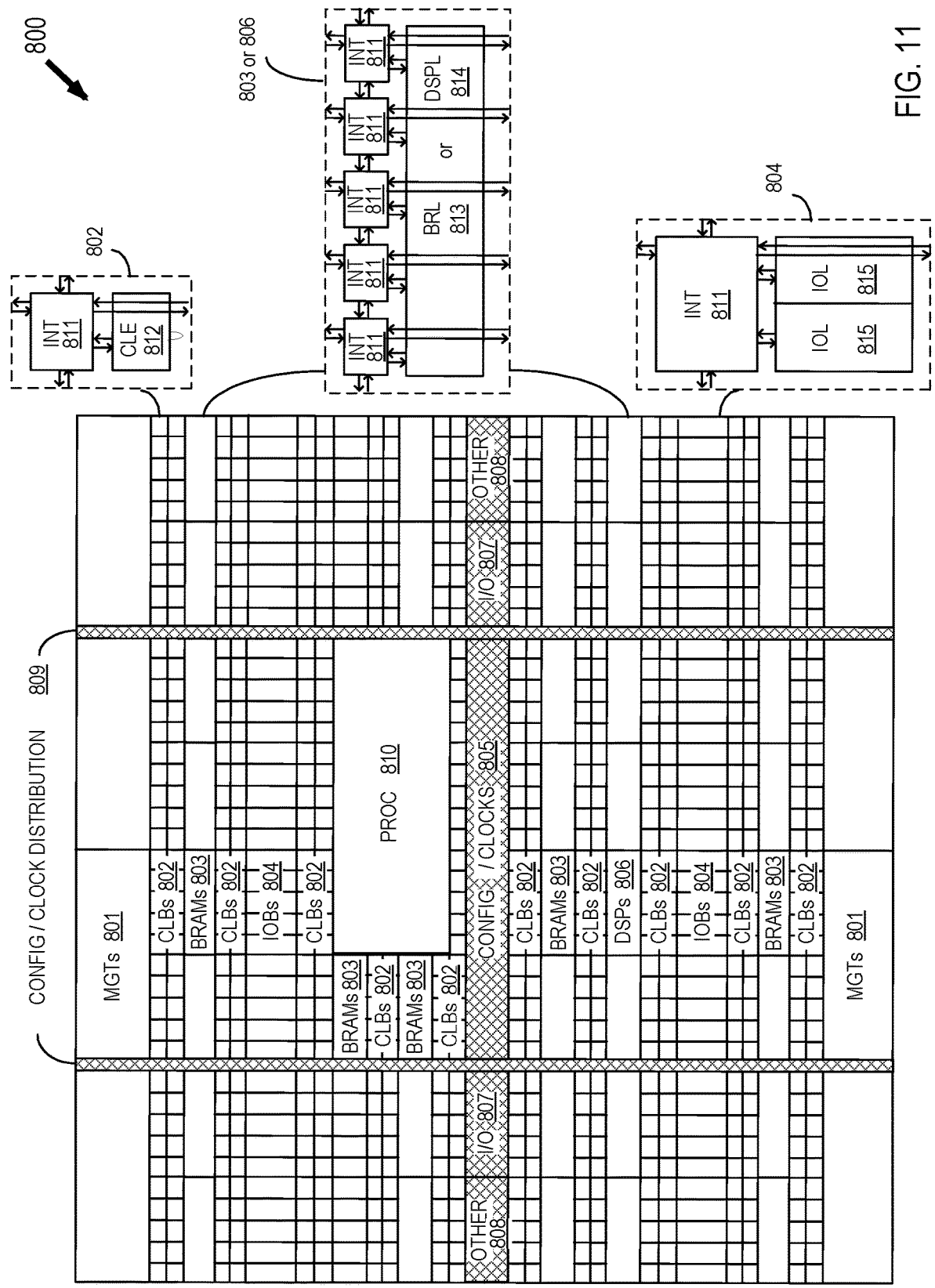
FIG. 11 shows a programmable integrated circuit (IC) on which the disclosed circuits and processes may be implemented.

FIG. 11 shows a programmable integrated circuit (IC) 800 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 11 illustrates programmable IC 800 that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some programmable IC having FPGA logic also include dedicated processor blocks (PROC) 810 and internal and external reconfiguration ports (not shown).

In some FPGA logic, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA logic. The programmable interconnect element INT 811 also includes the connections to and from the programmable logic element within the same tile, as shown by the examples included at the top of FIG. 11.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 806 can include a DSP logic element (DSPL) 814 in addition to an appropriate number of programmable interconnect elements. An 10B 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

A columnar area near the center of the die (shown shaded in FIG. 11) is used for configuration, clock, and other control logic. Horizontal areas 809 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 11 include additional logic blocks that disrupt the regular columnar structure making up a large part of the programmable IC. The additional logic blocks can be programmable blocks and/or dedicated logic. For example, the processor block PROC 810 shown in FIG. 11 spans several columns of CLBs and BRAMs.

Note that FIG. 11 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 11 are purely exemplary. For example, in an actual programmable IC, more than one adjacent column of CLBs is typically included wherever the CLBs appear, to facilitate the efficient implementation of user logic.

Various modules may be implemented to carry out one or more of the operations and activities described herein and/or shown in the figures. In these contexts, a "module" is a circuit that carries out one or more of these or related operations/activities (e.g., convolution operations). For example, one or more modules are discrete logic circuits or programmable logic circuits configured and arranged for implementing these operations/activities, as in the circuit modules shown in FIGS. 1, 3, 7, and 8. The programmable circuit can include programmable logic, such as a field programmable gate array (FPGA) and/or one or more instruction processing circuits. The instruction processing circuits can be programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Some implementations are directed to a computer program product (e.g., nonvolatile memory device), which includes a machine or computer-readable medium having stored thereon instructions which may be executed by a computer (or other electronic device) to perform these operations/activities Though aspects and features may in some cases be described in individual figures, it will be appreciated that features from one figure can be combined with features of another figure even though the combination is not explicitly shown or explicitly described as a combination.

The circuits and methods are thought to be applicable to a variety of neural network systems. Other aspects and features will be apparent to those skilled in the art from consideration of the specification. The circuits and methods can be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
a first register configured to store a first convolutional neural network (CNN) instruction during processing of the first CNN instruction;

a second register configured to store a second CNN instruction during processing of the second CNN instruction;
a memory arrangement;
a plurality of address generation circuits coupled to the memory arrangement and configured to generate addresses of data elements of an input feature map (IFM) and an output feature map (OFM) in response to an input CNN instruction;
control circuitry configured to:
  select the first CNN instruction as input to a first subset of the plurality of address generation circuits, the first subset including two or more of the plurality of address generation circuits, and
  select, concurrent with selection of the first CNN instruction, the second CNN instruction as input to a second subset of the plurality of address generation circuits, the second subset exclusive of the two or more address generation circuits; and
multiply-and-accumulate circuitry configured to perform multiply-and-accumulate operations on the data elements of the IFM and a filter.

2. The circuit arrangement of claim 1, wherein the control circuitry is further configured to:
select the first CNN instruction as input to one or more of the plurality of address generation circuits for a first plurality of consecutive address generation cycles, in response to a first number of multiply-and-accumulate operations of the first CNN instruction; and
select the second CNN instruction as input to one or more of the plurality of address generation circuits for a second plurality of consecutive address generation cycles, in response to a second number of multiply-and-accumulate operations of the second CNN instruction.

3. The circuit arrangement of claim 2, wherein the control circuitry includes a shift register having a number of stages equal in number to the plurality of address generation circuits, and the control circuitry is configured to select output from either the first register or the second register for input to each address generation circuit in response to a state of a corresponding stage in the shift register.

4. The circuit arrangement of claim 1, wherein:
a first one, of the address generation circuits is configured to generate a sequence of output feature map (OFM) coordinate pairs;
a second one of the address generation circuits is configured to generate a memory store address in response to each OFM coordinate pair;
a third one of the address generation circuits is configured to determine boundaries of a sub-matrix of an input feature map (IFM) in response to each OFM coordinate pair;
a fourth one of the address generation circuits is configured to generate a sequence of IFM coordinate pairs in response to the boundaries; and
a fifth one of the address generation circuits is configured to generate a memory read address in response to each IFM coordinate pair.

5. The circuit arrangement of claim 4, wherein the third one of the address generation circuits is further configured to determine boundaries of the sub-matrix of a non-padded IFM in response to each OFM coordinate pair.

6. The circuit arrangement of claim 1, wherein the plurality of address generation circuits and control circuitry are implemented in programmable logic of a programmable integrated circuit.

7. A circuit arrangement, comprising:
a plurality of computation circuits 1 through M, each computation circuit configured to perform multiply-and-accumulate operations of a different layer of a convolutional neural network (CNN), and each computation circuit J for 1<J<=M configured to compute one or more layers of the CNN based on output data from computation circuit J−1;
a plurality of pairs of memory circuits, wherein each pair of memory circuits includes a first memory circuit and a second memory circuit, and a respective pair of the plurality of pairs of memory circuits is coupled between computation units K and K−1 for 1<K<=M;
wherein computation circuits K−1 and K are configured to concurrently write to and read from the first and second memory circuits of the respective pair during a first time interval, respectively, and concurrently write to and read from the second and first memory circuits during a successive second time interval, respectively;
wherein each computation circuit includes respective address generation circuitry, each address generation circuitry including:
  a first register configured to store of a first CNN instruction during processing of the first CNN instruction;
  a second register configured to store a second CNN instruction during processing of the second CNN instruction;
  a plurality of address generation circuits configured to generate addresses of data elements of an input feature map (IFM) and an output feature map (OFM) in response to an input CNN instruction; and
  control circuitry configured to select one of the first CNN instruction or the second CNN instruction as input to the address generation circuits.

8. The circuit arrangement of claim 7, wherein the control circuitry is further configured to:
select the first CNN instruction as input to a first subset of the plurality of address generation circuits, the first subset including two or more of the plurality of address generation circuits; and
select, concurrent with selection of the first CNN instruction, the second CNN instruction as input to a second subset of the plurality of address generation circuits, the second subset exclusive of the two or more address generation circuits.

9. The circuit arrangement of claim 7, wherein the control circuitry is further configured to:
select the first CNN instruction as input to one or more of the plurality of address generation circuits for a first plurality of consecutive address generation cycles, in response to a first number of multiply-and-accumulate operations of the first CNN instruction; and
select the second CNN instruction as input to one or more of the plurality of address generation circuits for a second plurality of consecutive address generation cycles, in response to a second number of multiply-and-accumulate operations of the second CNN instruction.

10. The circuit arrangement of claim 9, wherein the control circuitry includes a shift register having a number of stages equal in number to the plurality of address generation circuits, and the control circuitry is configured to select output from either the first register or the second register for input to each address generation circuit in response to a state of a corresponding stage in the shift register.

11. The circuit arrangement of claim 7, wherein:
a first one, of the address generation circuits is configured to generate a sequence of output feature map (OFM) coordinate pairs;
a second one of the address generation circuits is configured to generate a memory store address in response to each OFM coordinate pair;
a third one of the address generation circuits is configured to determine boundaries of a sub-matrix of an input feature map (IFM) in response to each OFM coordinate pair;
a fourth one of the address generation circuits is configured to generate a sequence of IFM coordinate pairs in response to the boundaries; and
a fifth one of the address generation circuits is configured to generate a memory read address in response to each IFM coordinate pair.

12. The circuit arrangement of claim 11, wherein the third one of the address generation circuits is further configured to determine boundaries of the sub-matrix of a non-padded IFM in response to each OFM coordinate pair.

13. The circuit arrangement of claim 7, wherein the plurality of address generation circuits and control circuitry are implemented in programmable logic of a programmable integrated circuit.

14. A method comprising:
storing a first convolutional neural network (CNN) instruction in a first register during processing of the first CNN instruction;
storing a second CNN instruction in a second register during processing of the second CNN instruction;
generating addresses of data elements of an input feature map (IFM) and an output feature map (OFM) in response to an input CNN instruction by a plurality of address generation circuits;
selecting the first CNN instruction by the control circuitry as input to a first subset of the plurality of address generation circuits, the first subset including two or more of the plurality of address generation circuits;
selecting by the control circuitry, concurrent with selection of the first CNN instruction, the second CNN instruction as input to a second subset of the plurality of address generation circuits, the second subset exclusive of the two or more address generation circuits; and
performing multiply-and-accumulate operations on the data elements of the IFM and a filter by multiply-and-accumulate circuitry.

15. The method of claim 14, further comprising:
selecting by the control circuitry the first CNN instruction as input to one or more of the plurality of address generation circuits for a first plurality of consecutive address generation cycles, in response to a first number of multiply-and-accumulate operations of the first CNN instruction; and
selecting by the control circuitry the second CNN instruction as input to one or more of the plurality of address generation circuits for a second plurality of consecutive address generation cycles, in response to a second number of multiply-and-accumulate operations of the second CNN instruction.

16. The method of claim 15, further comprising selecting output from either the first register or the second register for input to each address generation circuit by the control circuitry in response to a state of a corresponding stage in a shift register having a number of stages equal in number to the plurality of address generation circuits.

17. The method of claim 14, further comprising:
generating a sequence of output feature map (OFM) coordinate pairs by a first one, of the address generation circuits;
generating a memory store address in response to each OFM coordinate pair by a second one of the address generation circuits;
determining boundaries of a sub-matrix of an input feature map (IFM) in response to each OFM coordinate pair by a third one of the address generation circuits;
generating a sequence of IFM coordinate pairs in response to the boundaries by a fourth one of the address generation circuits; and
generating a memory read address in response to each IFM coordinate pair by a fifth one of the address generation circuits.

18. The method of claim 17, further comprising determining boundaries of the sub-matrix of a non-padded IFM in response to each OFM coordinate pair by the third one of the address generation circuits.

* * * * *